US006471176B2

(12) United States Patent
Berthiaume

(10) Patent No.: US 6,471,176 B2
(45) Date of Patent: Oct. 29, 2002

(54) STAFF HOLDER

(76) Inventor: Edmond R. Berthiaume, Riel Dr., Auburn, MA (US) 01501

( * ) Notice: Subject to any disclaimer, the term of this patent is extended or adjusted under 35 U.S.C. 154(b) by 18 days.

(21) Appl. No.: 09/788,774

(22) Filed: Feb. 20, 2001

(65) Prior Publication Data

US 2002/0113190 A1 Aug. 22, 2002

(51) Int. Cl.[7] .................................................. F16M 13/00
(52) U.S. Cl. .................... 248/523; 248/529; 248/125.8; 248/121
(58) Field of Search ................................. 248/523, 511, 248/519, 521, 524, 527, 910, 125.8, 404, 410, 159, 415, 157

(56) References Cited

U.S. PATENT DOCUMENTS 1,155,383 A 10/1915 Tischer
1,631,227 A 6/1927 See
1,694,815 A * 12/1928 Garlick ........................ 248/529
1,970,624 A * 8/1934 Recker ........................ 248/412
2,242,270 A 5/1941 Sims
2,902,592 A * 9/1959 Cole et al. .................. 362/277
2,913,202 A * 11/1959 Meldrum .................... 47/40.5
3,415,475 A 12/1968 Goodman
4,895,339 A * 1/1990 Yang et al. ................. 248/522
5,011,104 A * 4/1991 Fang ........................ 248/125.8
5,160,110 A 11/1992 Praegitzer
5,427,346 A 6/1995 Urgola
5,772,162 A * 6/1998 Lin ............................ 248/121
5,918,849 A 7/1999 Bliss
6,012,698 A * 1/2000 Hardt et al. ................ 248/523
6,113,054 A 9/2000 Ma

* cited by examiner

*Primary Examiner*—Anita King
(74) *Attorney, Agent, or Firm*—Blodgett & Blodgett, P.C.

(57) ABSTRACT

In general, the invention consists of a staff holder that includes a supporting base, a vertical post attached to the supporting base and a hand actuated chuck at the top of the post. The chuck includes an inner ring fixed to the post, a plurality of gripping jaws supported in the ring for transverse movement relative to the central vertical axis of the post, an outer ring mounted on the inner ring for rotation about the vertical axis of the post and a camming mechanism for causing the gripping jaws to move transversely relative to the inner ring upon manual rotation of the outer ring. More specifically, the post of the holder is removably connected to the base.

12 Claims, 5 Drawing Sheets

STAFF HOLDER

CROSS-REFERENCE TO RELATED APPLICATIONS

Not applicable.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is generally directed to a holder for a staff such as a flag staff or umbrella staff. The present invention is specifically directed to a free standing staff holder which is adjustable for releasably securing staffs of different thickness.

Most staff holders are adapted to be secured to a fixed structure. Other staff holders are free standing and include a broad and weighted base for supporting the staff and means for securing the staff to the holder. One type of holder includes a tubular vertical post extending upwardly from a base and having a top opening for receiving a staff. The staff is secured within the post by a locking screw. This is a relatively simple design but is not completely effective in securing the staff. There are a number of staff holders which are very effective in securing the staff to the post. However, all of these latter holders are complicated, expensive and difficult to use. These an other difficulties experienced with the prior art staff holders have been obviated by the present invention.

It is, therefore, a principal object of the invention to provide a staff holder that includes a base, post, and adjustable hand actuated locking mechanism for securely locking the staff to the post.

A further object of the present invention is the provision of a modular staff holder which can be quickly assembled and disassembled and which includes hand actuated means for securing the staff to the holder.

Another object of the present invention is the provision of a staff holder which is simple in construction, easy to use and effective for securely holding a staff.

With these and other objects in view, as will apparent to those skilled in the art, the invention resides in the combination of parts set forth in the specification and covered by the claims appended hereto.

BRIEF SUMMARY OF THE INVENTION

In general, the invention consists of a staff holder that includes a supporting base, a vertical post attached to the supporting base and a hand actuated chuck at the top of the post. The chuck includes an inner ring fixed to the post, a plurality of gripping jaws supported in the ring for transverse movement relative to the central vertical axis of the post, an outer ring mounted on the inner ring for rotation about the vertical axis of the post and a camming mechanism for causing the gripping jaws to move transversely relative to the inner ring upon manual rotation of the outer ring. More specifically, the post of the holder is removably connected to the base.

BRIEF DESCRIPTION OF THE DRAWINGS

The character of the invention, however, may be best understood by reference to one of its structural as illustrated by the accompanying drawings, in which.

DETAILED DESCRIPTION OF THE INVENTION

Figure 1:
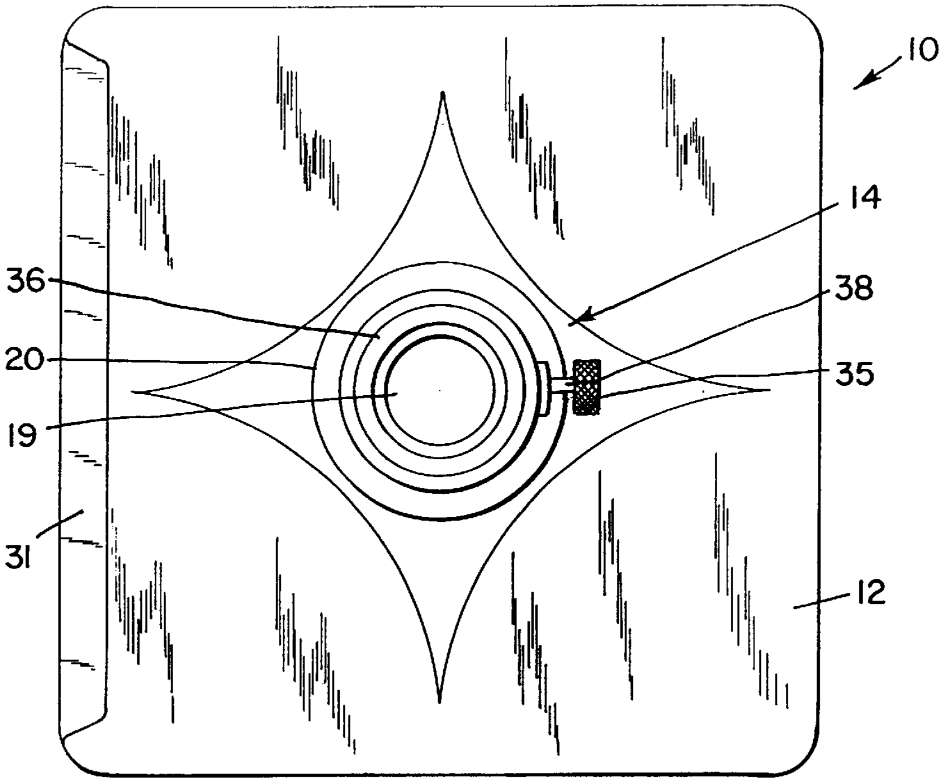
FIG. 1 is a top plan view of a staff holder embodying the principals of the present invention.
Figure 2:
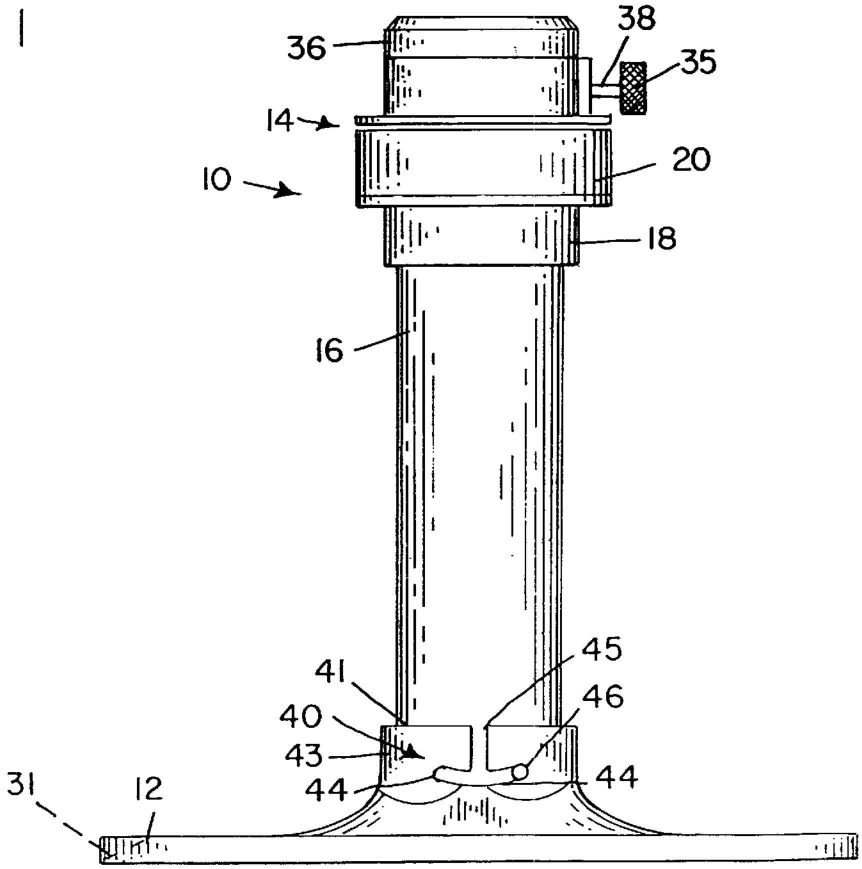
FIG. 2 is a side elevational view of a staff holder, showing the holder in the assembled positions.
Figure 3:
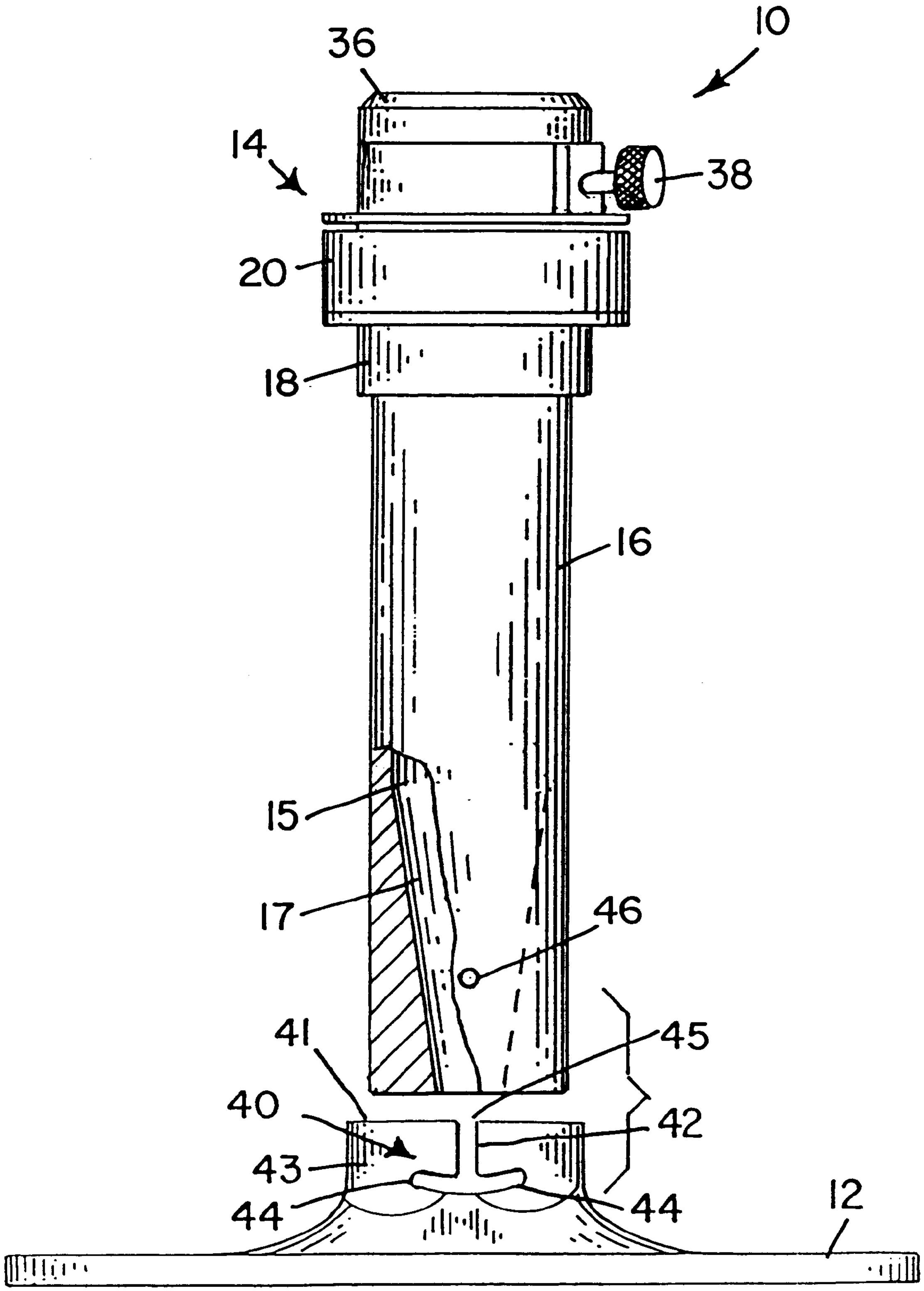
FIG. 3 is view similar to FIG. 2, showing the holder in a disassembled position.

Referring first to FIGS. 1–3, the staff holder of the present invention is generally indicated by the reference numeral 10, and includes a relatively flat supporting base 12, a vertical post 16, and a chuck, generally indicated by the reference numeral 14, fixed to the upper end of the post 16. The post 16 has a bore 15 that has a tapered section 17 at the bottom end of the post.

Referring specifically to FIGS. 4–8, the chuck 14 includes an inner ring 18 fixed to the upper end of the post 16 and an outer ring 20. The outer ring 20 is rotatably mounted in a groove 32 formed on the inner ring 18 between a lower annular shoulder 34 of the inner ring and an annular retaining cap 36 tightly secured to the upper end of the inner ring 18. The inner ring 18 has a cylindrical cavity 19 and a top opening 21 to the cavity 19. The inner ring 18 has a plurality of horizontal slots 24 faced at 90° intervals about the vertical central longitudinal axis of the chuck 14. Each slot 24 contains a gripping jaw 22 slidably mounted in the slot toward and away from the central longitudinal axis of the chuck. The outer ring 20 has a plurality of vertical grooves 26 which are non-concentric with the central longitudinal axis of the chuck. Each gripping jaw 22 has an L-shaped guide finger 28. Each guide finger 28 has a downwardly extending leg portion which extends into one of the grooves 26. The inner end of each gripping jaw 22 has a plurality of sharp projections 48.

Figure 4:
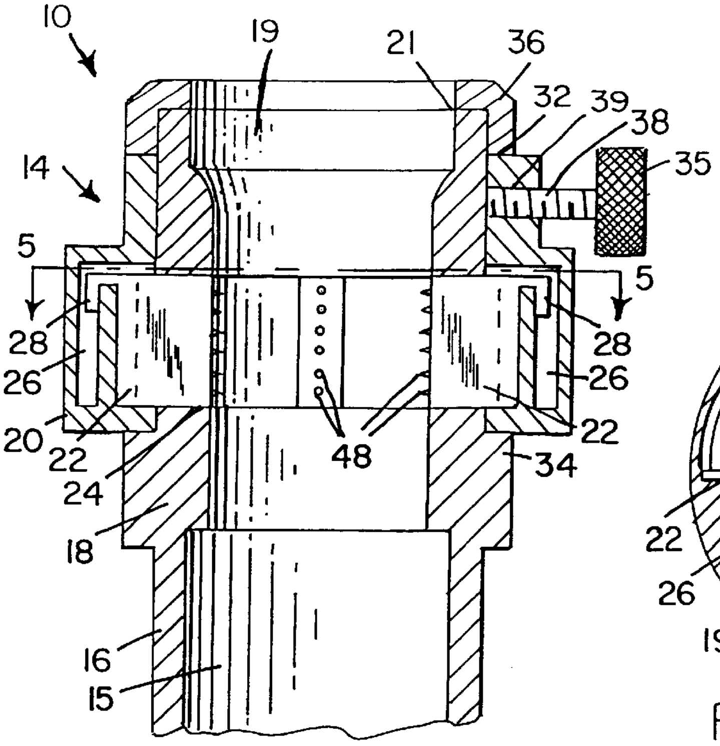
FIG. 4 vertical cross-sectional view of the holder, taken along the line 4—4 of FIG. 1, looking in direction of the arrows and showing the chuck portion of the holder in a fully opensition.
Figure 5:
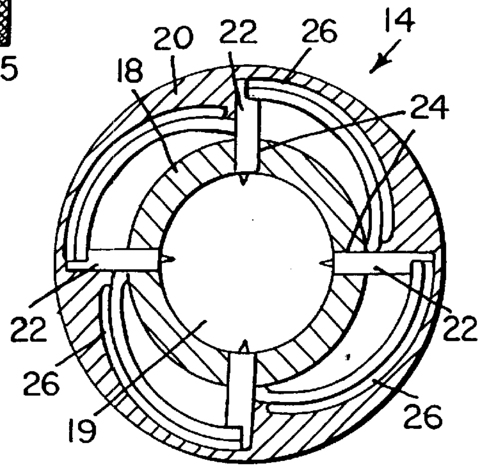
FIG. 5 is a horizontal cross-sectional view taken along the line 5—5 of FIG. 4, looking in the direction the arrows.
Figure 6:
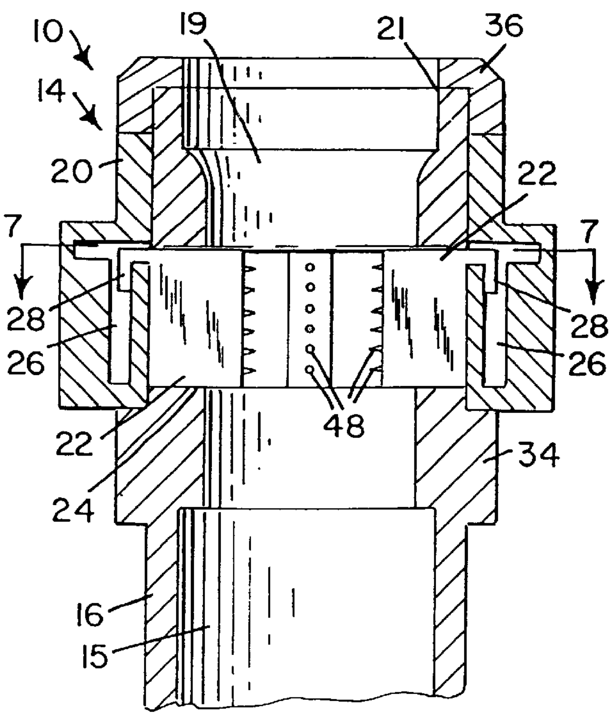
FIG. 6 is view similar to FIG. 4 and showing the chuck portion of the holder in a fully closed poo
Figure 7:
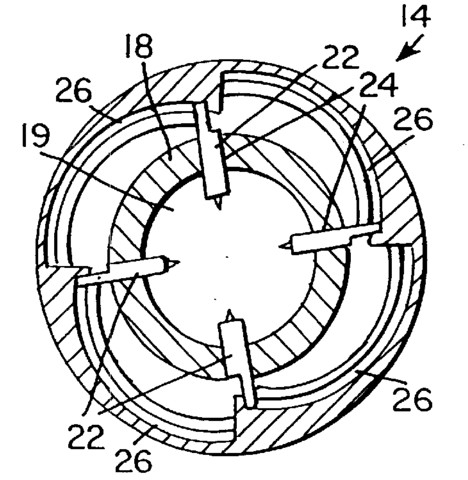
FIG. 7 is horizontal front sectional view taken along the line 7—7 of FIG. 6, looking in the direction of the arrows.
Figure 8:
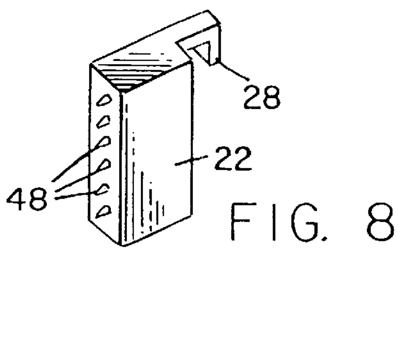
FIG. 8 is a metric view of one of the gripping jaws which forms part of the chuck.

The chuck 14 is shown in FIGS. 4 and 5 in its fully open position, wherein the guide finger 28 of each gripping jaw 22 is located in the portion of a groove 26 which is furthest from the central longitudinal axis of the chuck. The chuck 14 is actuated to its fully closed position by rotating the outer ring 20 relative to the inner ring 18 for nearly 90°. The guide finger 28 for each gripping jaw 22 moves from the outermost part of its respective groove 26, as shown in FIG. 5, to the innermost portion of the groove 26, as shown in FIG. 7, thereby, forcing the gripping jaw 22 inwardly relative to the inner ring 18, as shown in FIG. 7. This enables the chuck to accommodate staffs of different sizes.

The staff of a flag or umbrella is inserted into the chamber 19 from the top opening 21 with the chuck 14 in the open position, as shown in FIGS. 4 and 5. The outer ring 20 is rotated relative to the inner ring 18 until the gripping jaws 22 engage the staff to hold the staff tightly in place. The staff will remain in the secured position within the chamber 19 unless the outer ring 22 is rotated the opposite direction, counterclockwise as viewed in FIG. 7. Preferably, the outer ring 20 is secured against rotation relative to the inner ring 18 by a locking screw 38 that is screwed into a threaded aperture 39 in the outer ring 20. The locking screw 38 has a relatively large head portion 35 with a gripping surface that enables the screw 38 to be turned manually. Very little holding force is required to keep the outer ring 20 from rotating relative to the inner ring 18.

Referring again to FIGS. 1–3, the post 16 is detachably connected to the base 12. The base 12 has an upwardly extending vertical projection 43 having an upwardly facing socket 41 for receiving the lower end of the post 16. Projection 43 also has an inverted T-shaped slot, generally indicated by the reference numeral 40, which includes a vertical portion 42 and a pair of oppositely extending horizontal portions 44. The vertical portion 42 has a top opening 45. The post 16 has a horizontally extending pin 46, spaced from the bottom end of the post. The post 16 is connected to the base 12 by inserting the bottom end of the post 16 into the socket 40 so that the pin 46 is aligned with the opening 45. The post 16 is moved downwardly into the socket 41 until the pin reaches the horizontal portions 44 of the inverted T-shaped slot. The post 16 is then rotated relative to the base 12 so that the pin 46 moves to one end of one of the horizontal portions 44, thereby removably securing the post 16 to the base 12. In the example shown in FIGS. 1 and 2, the slot 40 is T-shaped so that the post 16 can be connected to the base 12 by rotating the post in either direction. However, an L-shaped slot consisting of a vertical portion 42 and one horizontal portion 44 would also be just as effective. One side of the base 12 has a sloped edge 31 which enables the base to be used as a shovel or a scoop for digging in the sand at the beach.

Figure 9:
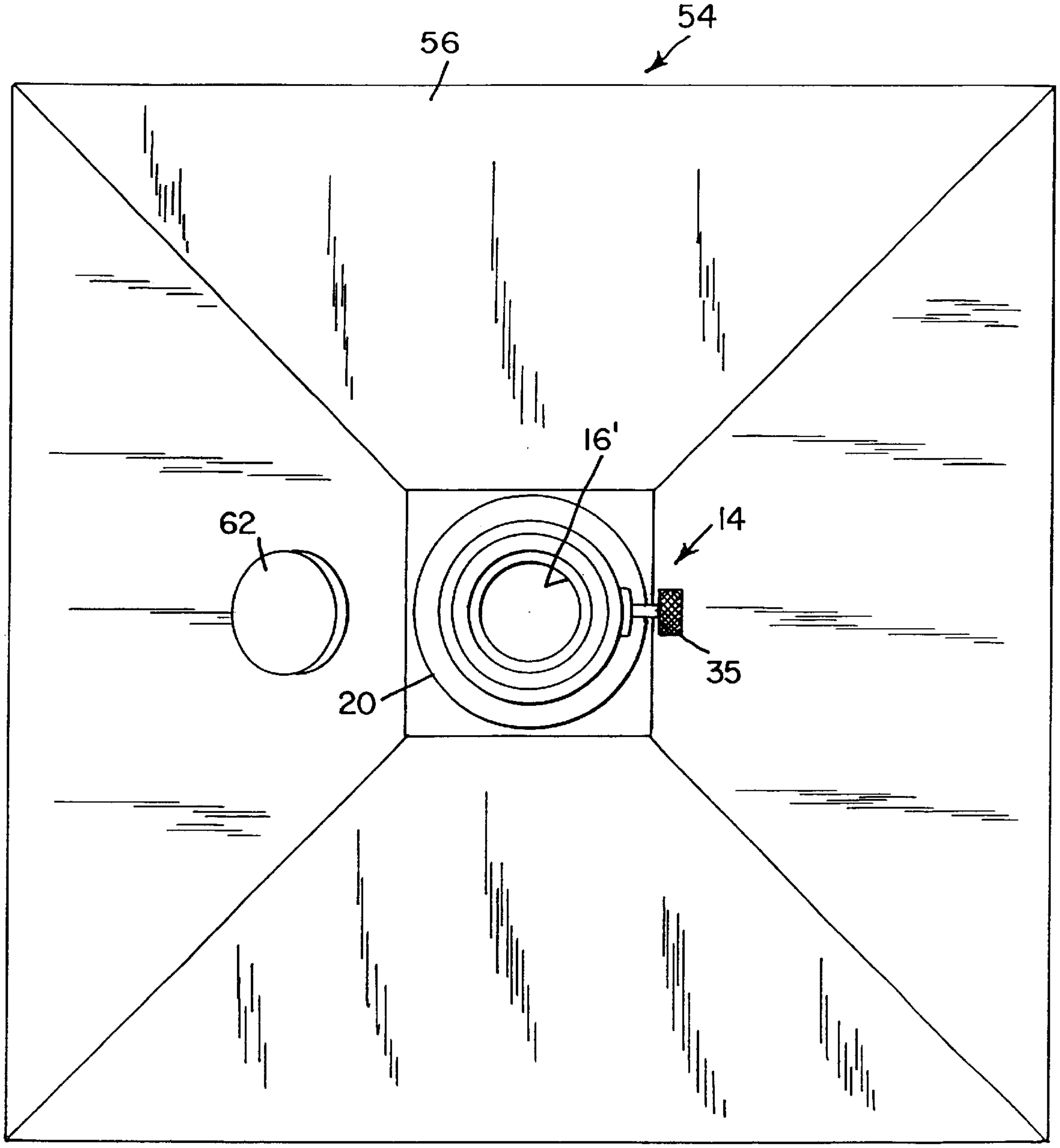
FIG. 9 plan view of a modified staff holder.
Figure 10:
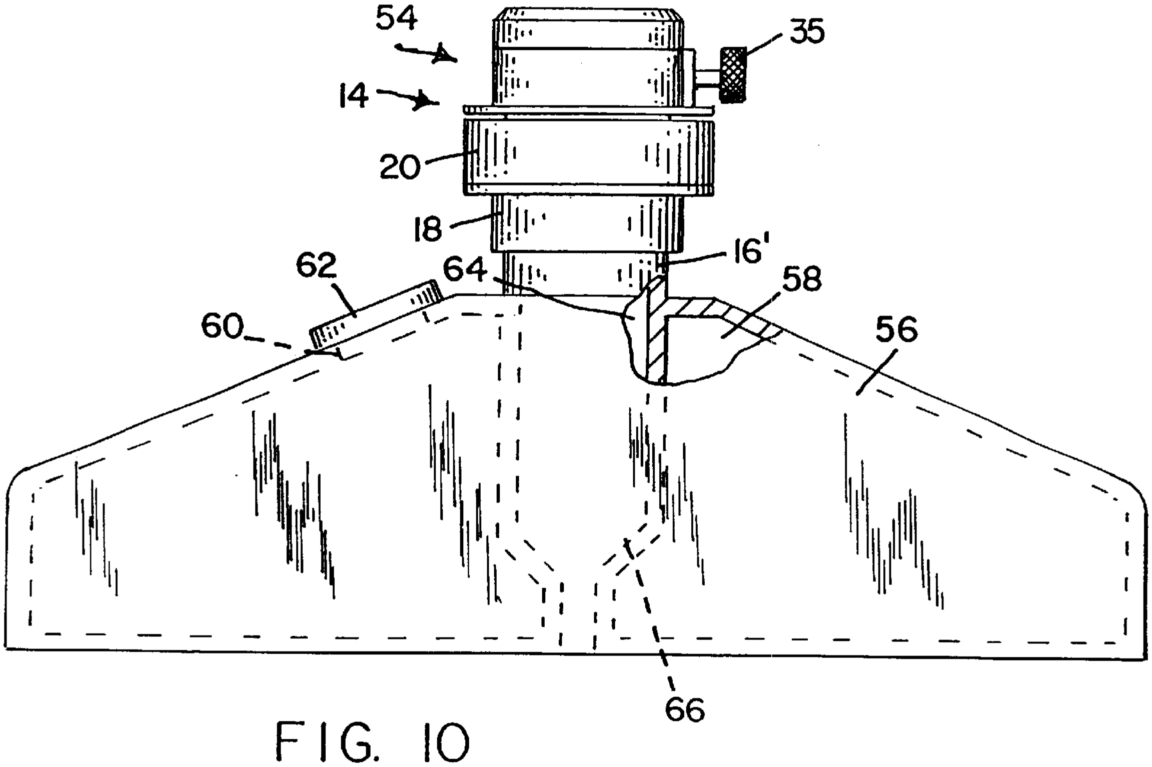
FIG. 10 a side elevational view of the modified staff holder of FIG. 9.

Referring to FIGS. 9 and 10, there is shown a modified staff holder, generally indicated by the reference numeral 54, that includes the previously described chuck 14 fixed to the upper end of a vertical post 16 that is integrally formed with a supporting base 56. The supporting base 56 has a large cavity 58 and a top opening 60 to the cavity 58. The base 56 has a bore 64 that includes a lower tapered portion 66. The base can be used alone or with the post 16 which functions as a handle.

When the staff holder 10 is used at the beach, a hole is dug in the sand with the use of the base 12. The base is positioned in the hole and subsequently covered with sand so that the base is firmly anchored in the sand prior to insertion of the staff of an umbrella into the chuck 14. The top opening 60 has internal threads for receiving a threaded cap 62 for closing the opening. The cavity 58 can be filled with a fillable material such as water or sand to add weight to the base 56, thereby making the base more stable.

The invention having been thus described, what is claimed as new and desired to secure by Letters Patent is:

1. A holder for a staff, said holder comprising:

(a) a supporting base;

(b) a vertical post attached to said supporting base, said post having an upper end;

(c) a chuck attached to the upper end of said post, said chuck comprising:

(1) an inner ring fixed to the upper end of said post, said inner ring having a cylindrical chamber, a top opening to said chamber for enabling said staff to be inserted into said chamber and a plurality of horizontal slots to said chamber at different angular positions about said axis, said chamber having a vertical central longitudinal axis;

(2) a gripping jaw in each of said horizontal slots, each of said gripping jaws being supported on said inner ring for horizontal movement relative to said inner ring toward and away from said central longitudinal axis;

(3) an outer ring mounted on said inner ring for rotation about said central longitudinal axis; and (4) a camming mechanism operatively connected to said gripping jaws and said outer ring for causing said gripping jaws to move into said chamber toward said longitudinal axis when said outer ring is rotated in a first direction for engaging and clamping said staff and for causing said jaws to move away from said central longitudinal axis when said outer ring is rotated in a second direction.

2. The holder as recited in claim 1, wherein said camming mechanism comprises;

(a) a plurality of vertical grooves located in said outer ring at different positions relative to said axis, each of said grooves being associated with a particular one of said gripping jaws and being non- concentric with said axis; and (b) a guide finger fixed to each of said gripping jaws and extending into a corresponding one of said grooves.

3. The holder as recited in claim 1, further comprising a locking device for releasably locking said outer ring against rotation on said inner ring.

4. The holder as recited in claim 3, wherein said locking device is a screw threaded into said outer ring for engaging said inner ring.

5. The holder as recited in claim 1, wherein said post is removably attached to said supporting base.

6. The holder as recited in claim 1, wherein said post has a lower free end and said supporting base has an upwardly facing socket for receiving said lower free end.

7. The holder as recited in claim 6, wherein said holder further comprises means for releasably locking said lower free end in said socket.

8. The holder as recited in claim 7, wherein said post has a horizontal pin fixed to said lower end and extending outwardly from said lower end and, wherein said upwardly facing socket is defined by a tubular wall containing an L-shaped slot having an upper vertical portion a lower horizontal portion and a top opening to said vertical upper portion for receiving said pin.

9. The holder as recited in claim 1, wherein said supporting base has a cavity and an upper opening to said cavity for enabling said cavity to be filled with flowable substance.

10. The holder as recited in claim 9, wherein said post has a lower free end and said supporting base has an upwardly facing socket for receiving said lower free end.

11. The holder as recited in claim 10, wherein said holder further comprises means for releasably locking said lower free end in said socket.

12. The holder as recited in claim 11, wherein said post has a horizontal pin fixed to said lower end and extending outwardly from said lower end and, wherein said upwardly facing socket is defined by a tubular wall containing an inverted T-shaped slot having an upper vertical portion, a pair of lower oppositely extending horizontal portions and a top opening to said vertical upper portion for receiving said pin.

* * * * *